United States Patent Office.

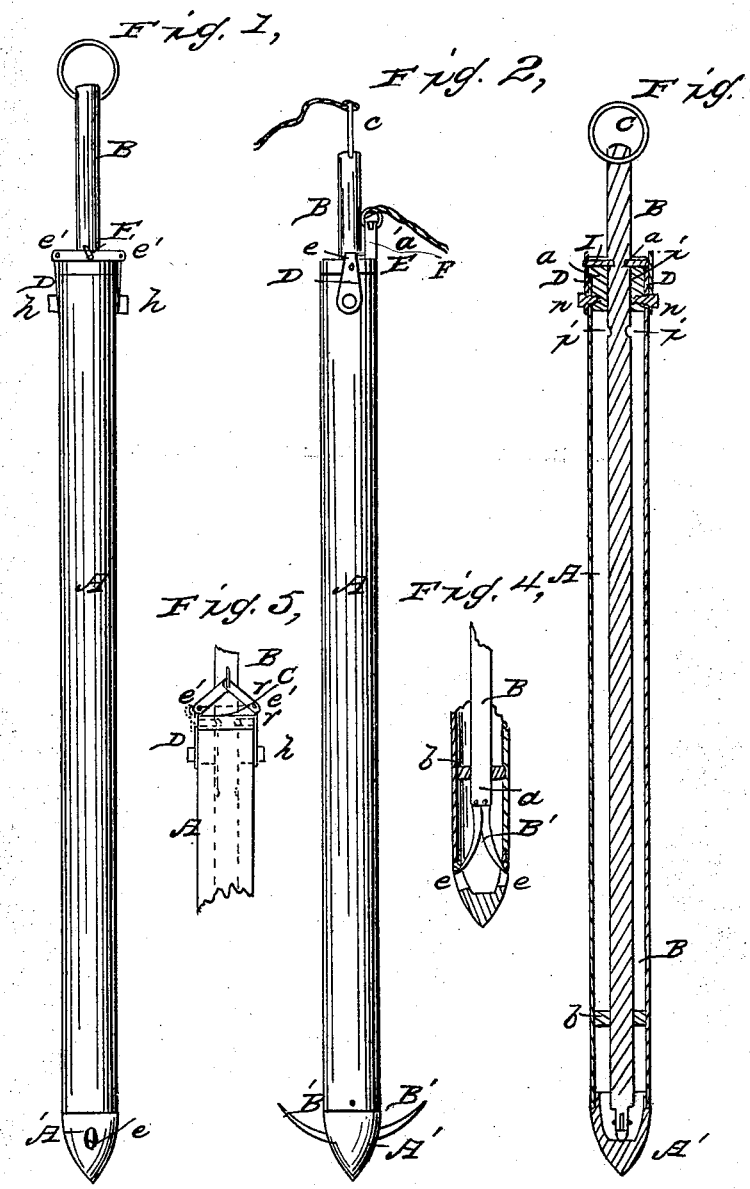

WILLIAM CARROLL, OF HILLSDALE, MICHIGAN, ASSIGNOR TO HIMSELF AND S. H. RHODES, OF CLYDE, OHIO.

Letters Patent No. 70,695; dated November 12, 1867.

IMPROVEMENT IN HORSE HAY-FORKS.

*The Schedule referred to in these Letters Patent and making part of the same.*

TO ALL WHOM IT MAY CONCERN:

Be it known that I, WILLIAM CARROLL, of Hillsdale, in the county of Hillsdale, and State of Michigan, have invented certain new and useful Improvements in Hay-Forks; and I do hereby declare that the following is a full and complete description of the same, reference being had to the accompanying drawings, making a part of this specification, in which—

Figure 1 is a side view.
Figure 2 is a front view.
Figure 3 is a vertical section.
Figures 4 and 5 are detached sections.

Like letters of reference refer to like parts in the views.

In the drawing, A represents a tube, in which slides the rod or shank B, passing through guides $a b$, fig. 3, the point A' being connected in any desirable way. Pivoted at $a'$ to one end of the rod B, are the tines B', the other end being provided with a ring, $c$, by means of which the fork is suspended. Secured near the top of the tubular shaft A, by means of the set-screws $n$, which also support the guide $a$, are the springs D, one on each side, as shown. To these springs are connected the nibs I, fig. 3, which extend through the guide $a$ to the shank, as hereafter referred to, which nibs are operated by the springs and toggle-joint E, fig. 5. The arms of this joint are attached to the upper part of these springs to form a joint at $e'$, as shown in fig. 2. $d$ is a ring connected to the joint E, to which ring a cord, $d'$, is attached, by means of which the joint is operated, thus moving the nibs I.

When the fork is to be used it is placed in the position shown in fig. 1, with the tines drawn in out of the way. In this position it is thrust into the hay. The tines being drawn in, as stated, it can be pushed in easily, and without the tines catching. The fork is then loaded by pressing down the rod. As this is done, the tines, being in the position shown in fig. 4, will pass out through the openings $e$, and coming against the lower edge of the opening, will be thrown out, as shown in fig. 2, thus forcing them into the hay.

The tines are locked or held in this position by means of the nibs and springs in the following manner: In the upper part of the rod are notches $i i'$, and as the rod is pushed down, the nibs catch in said notches, as shown in fig. 3, and then, by pulling on the cord $d'$, the toggle-joint will be raised from the position shown in fig. 1, to that shown in fig. 5, which, with the aid of the springs, forces said nibs and holds them in the said notches, and which cannot be removed till the arms of said joint are pushed back in position shown in fig. 1, which throws the nibs out of the notch, and allows the rod to be drawn back in place, the tines, in being drawn in, coming against the upper edge of the openings $e$, and thus drawing them in and closing them, as shown in fig. 4, thus dropping the hay where desired. The rod, when drawn in in this way, can be held by the nibs catching in the lower notches $i'$ in the rod.

With this fork the hay can be loaded or unloaded without any trouble. If the fork is swung out of reach the cord $d'$ can be pulled, and thus draw down the toggle-joint from the position shown in fig. 5 to that indicated by the dotted lines C in said figure, thus withdrawing the tines; or the fork, when pushed into the hay, can be locked by hand.

What I claim as my improvement, and desire to secure by Letters Patent, is—

The toggle-joint E, springs D, and nibs I, in combination with the tubular shaft and rod, substantially as and for the purpose set forth.

WM. CARROLL.

Witnesses:
W. H. BURRIDGE,
J. HOLMES.